United States Patent [19]

George

[11] Patent Number: 4,748,730

[45] Date of Patent: Jun. 7, 1988

[54] TOOL FOR MAKING UP A BELL AND SPIGOT PIPE JOINT

[76] Inventor: William L. George, 15742 Nash, Surprise, Ariz. 85374

[21] Appl. No.: 23,822

[22] Filed: Mar. 9, 1987

[51] Int. Cl.⁴ .......................................... B23P 19/04
[52] U.S. Cl. ...................................... 29/237; 29/267; 29/450
[58] Field of Search .............. 29/237, 525, 267, 450, 29/451, 235

[56] References Cited

U.S. PATENT DOCUMENTS

| | | | |
|---|---|---|---|
| 2,958,125 | 11/1960 | Nichols | 29/237 |
| 3,096,572 | 7/1963 | Simmons | 29/237 |
| 3,494,016 | 2/1970 | Evans | 29/237 |
| 3,571,896 | 3/1971 | Wilkerson | 29/237 |
| 3,653,115 | 4/1972 | Perkins | 29/237 |
| 3,988,819 | 11/1976 | Sato | 29/237 |
| 4,178,668 | 12/1979 | George | 29/237 |
| 4,501,055 | 2/1985 | George | 29/237 |
| 4,519,122 | 5/1985 | Miller | 29/237 |
| 4,598,452 | 7/1986 | Iseki | 29/237 |

*Primary Examiner*—Charlie T. Moon

*Attorney, Agent, or Firm*—James H. Phillips

[57] ABSTRACT

A unitary tool assembly is disclosed for making up bell and spigot joints to couple adjacent pipe sections. The tool includes forward and rearward pipe engaging subassemblies and an intermediate linkage mechanism. The forward subassembly, which straddles a pipe section having a bell end, includes a reciprocative actuator which, through the linkage mechanism, selectively causes toothed cams carried by the rearward subassembly to engage and disengage a pipe section having a spigot end and straddled by the rearward subassembly. When the actuator delivers a power stroke, the toothed cams securely engage the pipe section with the spigot end, and the rearward subassembly is simultaneously pulled toward the forward subassembly such that successive strokes of the actuator effect a ratcheting action in which the bell and spigot joint is made up through a series of stepwise movements of the pipe sections together. Each of the pipe engaging subassemblies includes a partial collar adapted to loosely fit over the pipe section it straddles to thereby provide support for the tool as it is used.

9 Claims, 2 Drawing Sheets

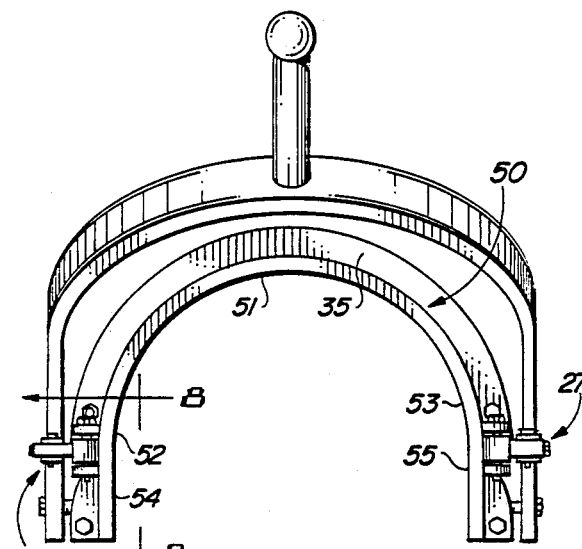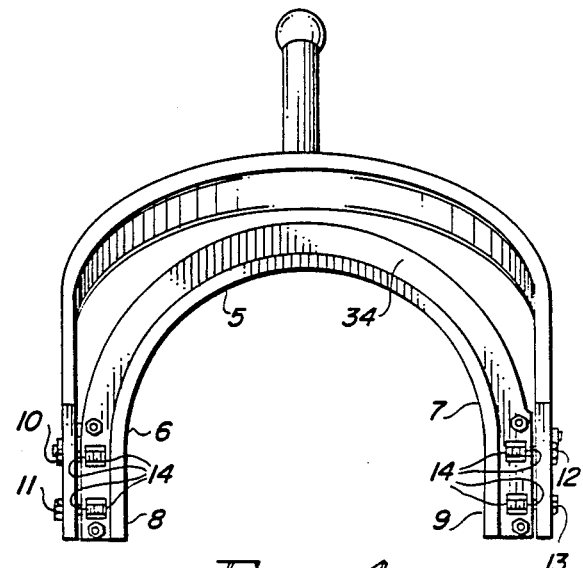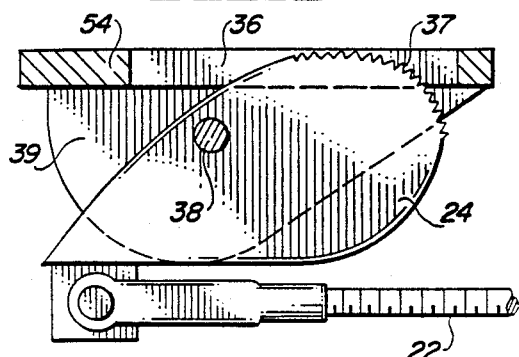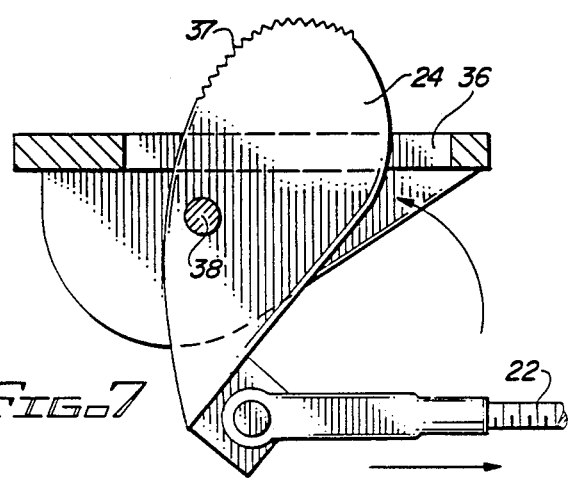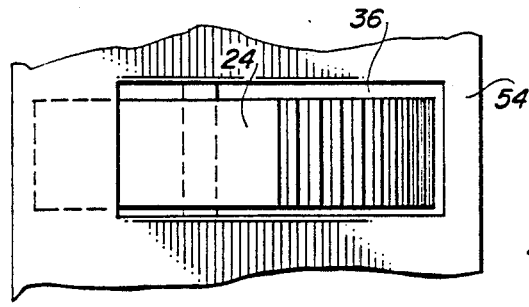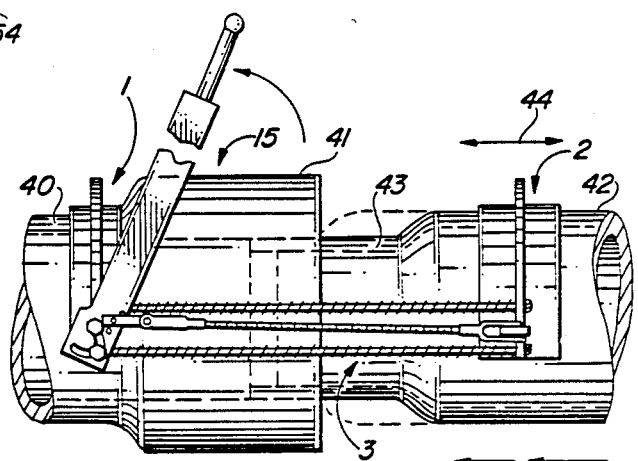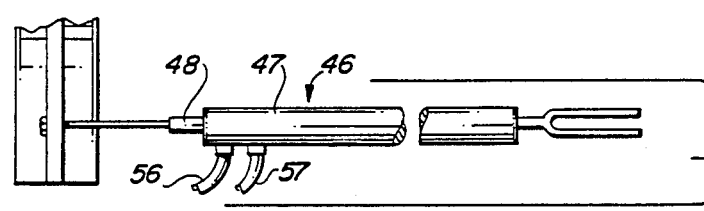

TOOL FOR MAKING UP A BELL AND SPIGOT PIPE JOINT

FIELD OF THE INVENTION

This invention relates to the tool arts and, more particularly, to a unitary tool assembly for making up bell and spigot pipe joints.

BACKGROUND OF THE INVENTION

Bell and spigot pipe joints have become widely used for relatively low pressure liquid transport systems because the bell and spigot joint obviates the necessity for welding or threading adjacent pipe sections together. In a bell and spigot system, each pipe section (except for an end section) has an enlarged diameter bell at one end and a reduced diameter spigot at the other end. Typically, the bell includes a resilient seal member disposed circumferentially about its inner surface such that, when the spigot of an adjacent pipe section is introduced into the bell and the two pipe sections are pulled together, the outer diameter of the spigot closely engages the inner diameter of the seal to complete the coupling process.

It will be appreciated by those skilled in the art that one long standing difficulty associated with laying bell and spigot coupled pipe systems is the difficulty in carrying out the repetitive task of pulling adjacent pipe sections together. Since there is considerable frictional engagement between the spigot and seal within the bell and further in view of the fact that the pipe sections (particularly in the larger sizes) are very heavy, this operation cannot be readily carried out without a special tool. As a result, a number of special tools have been developed for the specific purpose of pulling adjacent pipe sections in a bell and spigot coupled system together, and some of the special purpose tools have been the subject of United States patents. Among such prior art tools adapted to make up bell and spigot joints are those disclosed in U.S. Pat. Nos. 4,501,055; 4,178,668; 3,998,819; 3,571,896; 3,471,919; 3,373,477; 3,281,929; 3,270,406; 3,257,714; and 3,096,572.

While all these prior art tools have the capacity for carrying out their intended function, each is subject to one or more practical problems which include: complexity (many requiring assembly and disassembly for each pipe joint made), very heavy weight, accommodation to only a single size pipe (thus requiring an array of differently sized tools to handle pipes with diameters ranging from a few inches to several feet), limitation to use with only a single type of pipe, difficult operation, etc. My invention is directed to a special purpose tool which efficiently performs its intended purpose and suffers from none of the afore-mentioned drawbacks.

OBJECTS OF THE INVENTION

It is therefore a broad object of my invention to provide an improved tool for pulling together adjacent pipe sections into a bell and spigot joint.

It is another object of my invention to provide such a tool which constitutes a unitary assembly and thus requires no assembly or disassembly during use and eliminates the possibility of lost components.

It is yet another object of my invention to provide such a tool which can accommodate a range of pipe diameters as well as a range of pipe types.

It is still another object of my invention to provide such a tool which is relatively lightweight and easy to use.

In another aspect, it is an object of my invention to provide such a tool which is simple in construction and economical to fabricate and yet is very sturdy and durable.

SUMMARY OF THE INVENTION

Briefly, these and other objects of my invention are achieved by providing a relatively lightweight unitary pipe assembly tool which includes forward and rearward spaced apart pipe engaging subassemblies and an intermediate linkage mechanism which includes a reciprocative actuator carried by the forward subassembly. The forward subassembly includes a first partial collar which is adapted to straddle a first section of pipe behind its bell end and includes two pairs of parallel pivot journals disposed respectively at the lower ends of the two sides of the first partial collar. The rearward subassembly includes a second partial collar which is adapted to engage a second section of pipe behind its spigot end and includes a pair of toothed cams pivotally affixed near the respective partial collar ends. Each toothed cam operates within an aperture in the second partial collar and is selectively pivotal into the space encompassed by the second partial collar. The toothed cams are operated from an actuator assembly pivoted on the journals associated with the first partial collar through the linkage mechanism such that reciprocative operation of the actuator causes the toothed cams to alternatively extend inwardly into the space encompassed by the second partial collar to engage and pull the pipe and then withdraw out of engagement with the pipe. Thus, the spigot end of one pipe section may be inserted into the bell end (which carries an inner peripheral seal) of an adjacent pipe section and the tool subsequently emplaced over the bell with the forward pipe engaging subassembly straddling the pipe carrying the bell and the rearward pipe engaging subassembly straddling the pipe carrying the spigot. The actuator may then be operated reciprocatively to cause the teeth to alternatively engage and disengage the pipe carrying the spigot to thereby ratchet the tool into a position at which the first partial collar bears against the bell whereupon further reciprocative operation of the actuator repetitively pulls the pipe sections together stepwise until the spigot is firmly frictionally seated past the seal and within the bell.

DESCRIPTION OF THE DRAWING

The subject of the invention is particularly pointed out and distinctly claimed in the concluding portion of the specification. The invention, however, both as to organization and method or operation, may best be understood by reference to the following description taken in conjunction with the subjoined claims and the accompanying drawing of which:

FIG. 4 is a first end view of my tool assembly;

FIG. 5 is a second end view of my tool assembly;

FIG. 6 is a partial view taken along the lines 6—6 of FIG. 1 and espeically showing the orientation of a toothed cam in its first extreme position;

FIG. 7 is a partial view taken along the lines 7—7 of FIG. 2 illustrating the toothed cam in its other extreme position;

FIG. 8 is a partial view taken along the lines 8—8 of FIG. 5 and particularly showing the orientation of one of the toothed cams as it faces the interior of a partial collar;

FIG. 9 illustrates my tool assembly engaged with the bell and spigot of adjacent pipe sections being coupled with the aid of the tool; and FIG. 10 is a partial view illustrating a variant, hydraulically powered version of my tool assembly.

DETAILED DESCRIPTION OF THE INVENTION

Figure 1:
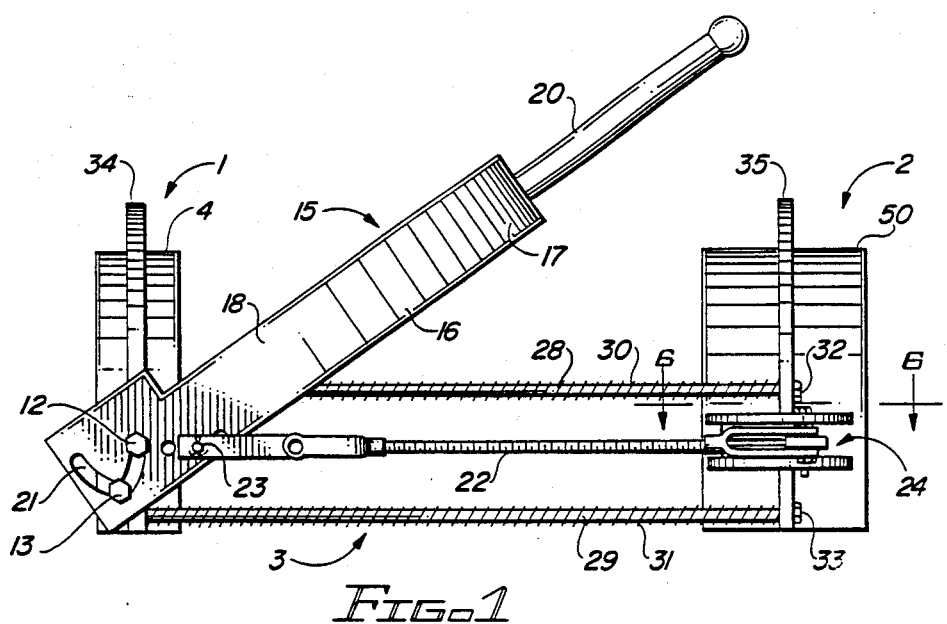
FIG. 1 is a side view of my unitary tool assembly shown with the actuator mechanism in one extreme position.

FIGS. 1, 3, 4 and 5 illustrate my unitary tool assembly with its actuator mechanism disposed in a first extreme position at which, as will be explained more fully below, pipe engaging toothed cams are retracted. The unitary tool assembly generally includes a forward pipe engaging subassembly 1, a rearward pipe engaging subassembly 2 and an intermediate linkage mechanism 3 disposed between and connecting the two pipe engaging subassemblies. The forward pipe engaging subassembly 1 includes a first partial collar 4 having a semi-circular section 5 (see FIG. 4) which integrally joins at points 6, 7 to first 8 and second 9 tangentially extending legs. The forward pipe engaging subassembly also includes opposed pairs of parallel vertically spaced upper and lower pivot journals fixed to and directed outwardly from the legs 8, 9. More particularly, extending outwardly from the leg 8 area an upper journal pivot 10 and a lower journal pivot 11. Similarly, extending outwardly from the leg 9 are an upper journal pivot 12 and a lower journal pivot 13. Conveniently, the journal pivots 10, 11, 12, 13 may comprise bolts threaded into nuts 14 welded or otherwise fixed to the first partial collar 4 or any other suitable internally threaded structure for receiving the bolts 10, 11, 12, 13.

Rearward pipe engaging subassembly 2 includes a second partial collar 50 which is preferably somewhat wider than the first partial collar 4. The second partial collar 50 also has a semi-circular section 51 (see FIG. 5) which joins at points 52, 53 to first 54 and second 55 tangentially extending legs. The rearward pipe engaging subassembly further includes opposed toothed cams 24, 27 which are adapted to selectively engage a pipe section adjacent a spigot end as will be explained more fully below.

The first partial collar 4 and the second partial collar 50 are each provided with outwardly directly flange members 34, 35, respectively, which function both as stiffeners to supplement the rigidity of the entire tool assembly and also as support structure for certain of the mechanisms incorporated into the tool.

Figure 2:
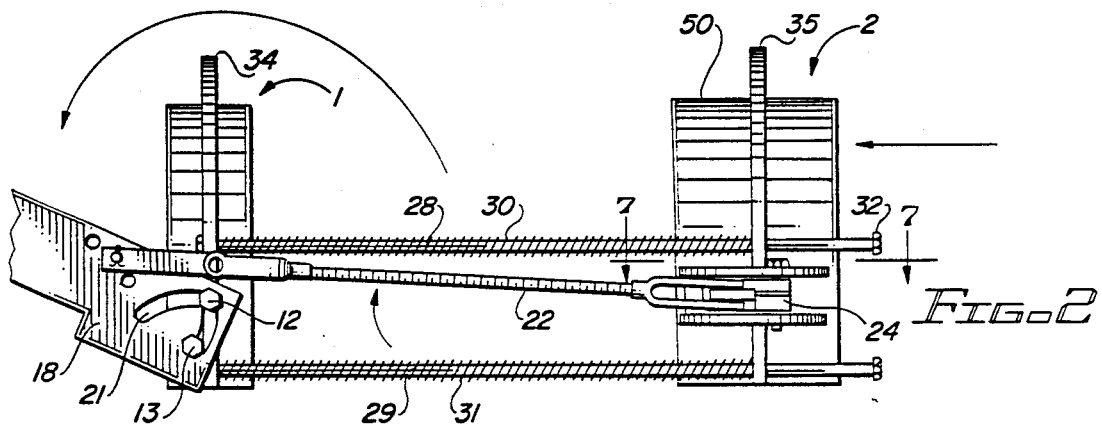
FIG. 2 is a view similar to FIG. 1 in which the actuator mechanism is at its other extreme position representing the completion of a "power stroke"
Figure 3:
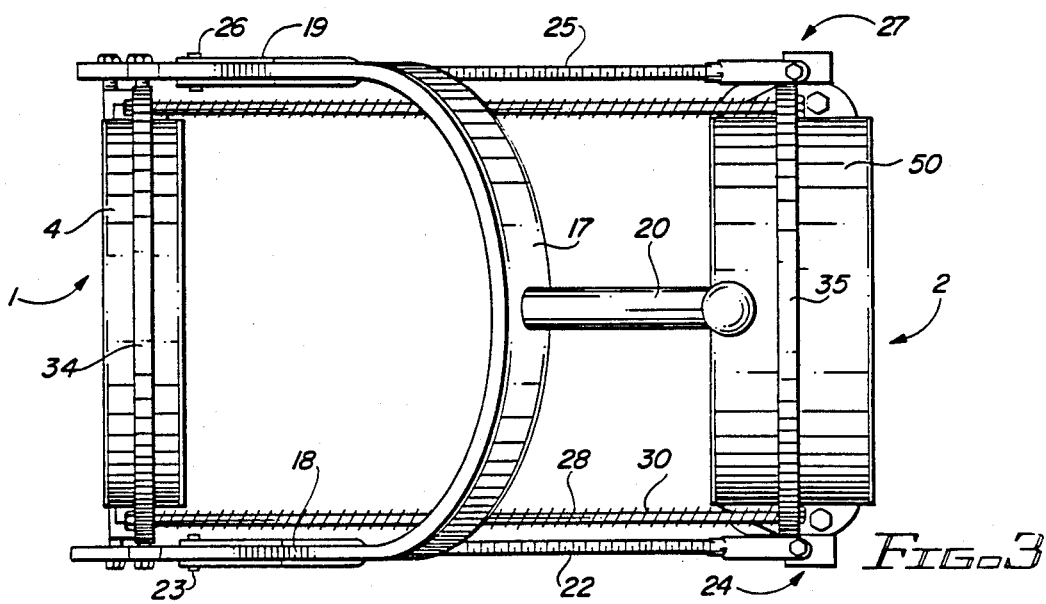
FIG. 3 is a top view of my tool assembly shown with the actuator mechanism in the same position as in FIG. 1.

As best shown in FIGS. 1, 2 and 3 (one side only of the tool assembly being in view in FIGS. 1 and 2), it will be observed that the forward pipe engaging subassembly 1 also includes a reciprocative actuator generally indicated at 15. The reciprocative actuator 15 includes a horseshoe shaped yoke 16 having an upper semi-circular portion 17 and first and second tangentially extending parallel legs 18, 19 joining the respective ends of the semi-circular portion 17. Centrally disposed on the semi-circular portion 17 of the yoke 16 is an outwardly extending handle 20 by which the reciprocative actuator may be manually operated in a manner which will become more apparent from the discussion to follow.

Referring specifically to FIGS. 1 and 2, situated at the base of the first leg 18 of the reciprocative actuator 15 is a V-shaped slot 21 for receiving the pivots 12, 13. It will be understood that a corresponding V-shaped slot is provided in the tangential leg 19, out of view in FIGS. 1 and 2, for identically receiving the pivots 10, 11. The dimensions of the V-shaped slot 21 (and the corresponding slot out of view) are selectedd such that the legs of the V are configured convex outwardly with the length of each leg of the V and the distance between the unjoined ends of the V being the same and corresponding to the distance between the pivot journals 12, 13. As a result, the yoke 17 pivots about the upper pivot journal 12 during a stroke of the yoke toward the rearward pipe engaging subassembly as shown in FIG. 1 and pivots about the lower pivot journal 13 during a stroke of the yoke away from the rearward pipe engaging subassembly as shown in FIG. 2. The latter condition, the extreme position of which is depicted in FIG. 2, may be deemed a "power stroke", and a certain amount of resistance must be encountered before the V slot 21 assumes the position illustrated in FIG. 2 at which the pivotal movement of the actuator 15 is about the lower pivot journal 13. The transition between the two pivot points is smoothly effected along the legs of the V slot 21 which guide the pivot journals.

As previously noted, the forward pipe engaging subassembly 1 and the rearward pipe engaging subassembly 2 are connected to effect a unitary tool assembly by the linkage mechanism 3 which includes a first link member 22 extending from the reciprocative actuator 15 at a pivot point 23 above the V-slot 21 rearwardly to the first pivotal toothed cam 24. Similarly, a second link member 25 is situated on the opposite side of the tool assembly and extends from a pivot point 26 to a second pivotal toothed cam 27.

The linkage mechanism also includes at least two elongated guides extending between the forward subassembly 1 and the rearward subassembly 2, and preferably, two such elongated guides are provided on each side of the tool assembly. A compression spring encompasses each elongated guide and is adapted to bias the forward and rearward subassemblies 1, 2 apart. Thus, on the side of the tool assembly including the first link member 22, there is also provided first and second elongated guides 28, 29 respectively surrounded by compression springs 30, 31. Each of the elongated guides 28, 29 are affixed to the forward subassembly 1 and slideably engage the rearwardly subassembly 2. the compression springs 30, 31 normally urge the subassemblies 1, 2 apart, but their effect is limited by end nuts 32, 33 which limit the distance by which the subassemblies can be separated. Thus, the mutual positions of the subassemblies at their normal (relaxed) extreme is illustratd in FIG. 1, and the opposite (closer) extreme is illustrated in FIG. 2 in which the extension of the guides 28, 29 as a result of the movement of the subassembly 2 toward the subassembly 1 is clearly evident. It will therefore be understood that, in FIG. 2, manual operation of the reciprocative actuator 15 has pulled the rearward subassembly 2 against the compression springs 30, 31 into the illustrated position.

FIG. 8 is a partial view taken along the lines 8—8 of FIG. 5 to illustrate the orientation of the toothed cam 24 shown recessed in an aperture 36 disposed in the tangentially extending leg 54 (see FIG. 5). It will be understood, of course, that a corresponding aperture is provided in the tangentially extending leg 55 to accommodate the toothed cam 27. FIG. 6 illustrates the toothed cam 24 in the retracted position which corresponds to the disengaged position illustrated in FIG. 1. Thus, the toothed portion 37 of the toothed cam 24 does not extend fully through the aperture 36 into the space defined by the inner walls of the collar 50. It will be noted that the toothed cam 24 is pivotally supported on a journal 38 which is, in turn, supported by a wing 39 welded or otherwise affixed to the leg 54. The journal 38 is vertically oriented and therefore permits horizontal rotation by the toothed cam 24 about the journal 38. Therefore, a longitudinal movement by the first link member 22 causes the toothed cam 24 to pivot eccentrically about the journal 38.

As a result, a second extreme position, illustrated in FIG. 7, for the toothed cam 24 may be obtained. In FIG. 7, operation of the reciprocative actuator away from the rearward pipe engaging subassembly to the position illustrated in FIG. 2 has resulted in longitudinal translation of the first link member 22 causing the first toothed cam 24 to pivot eccentrically about the journal 38 and thereby bring its toothed portion 37 beyond the aperture 36 and into the space encompassed by the partial collar 50. As a result, any pipe sidewall within the reach of the toothed portion 37 will be securely engaged. It will be appreciated, of course, that the second toothed cam 27 operates identically to and in unison with the toothed cam 24 to engage the opposite side of a pipe through the action of its corresponding link member 25.

From a study of FIG. 7, it will also be appreciated that a range of pipe radii may be accommodated which fall between the extreme position illustrated in FIG. 7 and a position just beyond the aperture 36. That is, for larger diameter pipe which can nonetheless be fitted within the partial collar 50, the toothed cam assembly 24 need not and will not reach the extreme position illustrated in FIG. 7 before its toothed portion 37 operatively engages the pipe sidewall. As a practical matter, the extreme position illustrated in FIG. 7 (and FIG. 2) will rarely be reached during an actual pipe-engaging operation.

The operation of the subject tool assembly may bst be appreciated with reference to FIG. 9 in which it has been lifted into position over a bell and spigot of adjacent pipe sections to be made up. Thus, the forward pipe engaging subassembly 1 straddles a first pipe section 40 immediately behind its bell end 41, and the rearward pipe engaging subassembly 2 straddles a second pipe section 42 just beyond its spigot end 43. Repetitive operation of the reciprocative actuator 15 brings the forward pipe engaging subassembly 1 snugly against the bell 41 and causes the rearward pipe engaging subassembly to alternatively move between the positions illustrated in FIGS. 1 and 2 as represented by the arrow 44. However, because of the first engaged and then disengaged positions which the toothed cams 24, 27 assume, the pipe section 42 is only gripped during the mutual movement toward one another of the subassemblies 1, 2 to provide stepwise make-up of the joint as represented by the arrows 45 until the spigot 43 is firmly seated past the seal (not shown) of the bell 41 to complete the operation. The unitary tool assembly need only then be lifted off the joint to await its use at the next joint to be made up.

Those skilled in the art will appreciate that, even with my tool, considerable power is required to make up bell and spigot joints in the larger pipe sizes which, for example, may be as much as forty-eight inches in diameter and very heavy. For such applications, a power assisted embodiment of my tool assembly may be employed. Referring to FIG. 10, one straightforward approach to providing either a power assist or fully power-actuated operation of the tool assembly is to substitute a hydraulic unit 46 for each of the link members 22, 25 (see FIG. 3). Therefore, merely by way of example, hydraulic fluid under pressure can be introduced into the hydraulic cylinder via supply conduit 56 to force the ram 48 inwardly to thereby pull the forward and rearward pipe engaging subassemblies together. Subsequent relief of the fluid pressure through the conduit 57 permits the ram 48 to extend and thereby the pipe engaging subassemblies to relax into a position corresponding to FIG. 1.

The subject tool assembly may be fabricated from any suitable material. However, relative lightweight is a practical advantage, and the presently preferred material for the partial collars 4, 50, the yoke 16 and other principal weight contributing elements is aluminum for that reason. It will be understood, however, that the use of such diverse materials as steel, magnesium and other appropriate metals is also contemplated.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A unitary tool assembly for coupling a pair of adjacent pipe sections of the type having respective bell and spigot joint elements by pulling the bell and spigot together into frictional engagement, said tool assembly comprising:

(A) a forward pipe engaging sub-assembly, said forward subassembly including:
   1. a first partial collar, said first partial collar having:
      a. a semi-circular section having first and second ends;
      b. a first tangential extension joining said first semi-circular section end of said first partial collar; and
      c. a second tangential extension joining said second semi-circular section end of said first partial collar;
   2. a first pair of parallel, vertically spaced, upper and lower pivot journals fixed to and directed outboard from said first tangential extension of said first partial collar;
   3. a second pair of parallel, vertically spaced, upper and lower pivot journals fixed to and directed outboard from said second tangential extension of said first partial collar;
   4. reciprocative actuator means, said actuator means first and second slots for respectively pivotally receiving said first and second of pivot journals;

(B) a rearward pipe engaging sub-assembly, said rearward subassembly including:
  1. a second partial collar, said second partial collar having:
     a. a semi-circular section having first and second ends.
     b. a first tangential extension joining said first semi-circular section end of said second partial collar;
     c. a second tangential extension joining said second semi-circular section end of said second partial collar;
     d. a first aperture disposed proximate the junction of said semi-circular section and said first tangential extnsion; and
     e. a second aperture disposed proximate the junction of said semi-circular section and said second tangential extension;
  2. a first toothed cam pivotally affixed to said second partial collar adjacent said first aperture and adapted to pivot between a first position in which said first cam is withdrawn outside the space within said second partial collar and a second position in which said first cam extends through said first aperture into the space within said second partial collar with the teeth of said first cam facing inwardly; and
  3. a second toothed cam pivotally affixed to said second partial collar adjacent said second aperture and adapted to pivot between a first position in which said second cam is withdrawn outside the space within said second partial collar and a second position in which said second cam extends through said second aperture into the space within said second partial collar with the teeth of said second cam facing inwardly;
(C) a linkage mechanism coupling said forward sub-assembly and said rearward sub-assembly, said linkage mechanism including:
  1. a first link member extending from said actuator means to said first cam;
  2. A second link member extending from said actuator means to said second cam;
  3. said first and second link members being respectively pivotally affixed to said actuator means at positions offset from said pivot journals such that reciprocating motion of said actuator means about said pivot journals alternatively pulls said forward and rearward sub-assemblies toward one another and permits them to spread apart and, during the actuation motion pulls said forward and rearward sub-assemblies toward one another, also pulls said first and second cams toward their respective second positions;
whereby the spigot may be inserted into the bell and said tool subsequently emplaced over the bell with said forward pipe engaging sub-assembly straddling the pipe carrying the bell and said rearward pipe engaging sub-assembly straddling the pipe carrying the spigot such that said actuator means may be operated reciprocally to cause said teeth to alternately engage and disengage the pipe carrying the spigot to thereby ratchet said tool into a position at which said first partial collar bears against the bell whereupon further reciprocating operation of said actuator pulls the pipe pair together until the spigot is firmly frictionally seated within the bell.

2. The unitary tool assembly of claim 1 in which said reciprocative actuator means further comprises:
(A) a generally horseshoe shaped yoke having:
  1. a semi-circular central portion;
  2. first and second tangentially extending vertical legs joining first and second ends of said semi-circular portion; and
  3. an outwardly extending handle fixed to said semi-circular portion;
and in which:
(B) said first and second slots are respectively situated proximate the lower terminations of said first and second legs.

3. The unitary tool assembly of claim 2 in which each case of said slots is V-shaped, the legs of the V being configured convex outwardly with the length of each leg of the V and the distance between the unjoined ends of the V being the same and corresponding to the distance between said pivot journals of each pivot journal pair, whereby said yoke pivots about said upper pivot journal of each pivot journal pair during a stroke of said yoke toward said rearward pipe engaging sub-assembly, and said yoke pivots about said lower pivot journal of each pivot journal pair during a stroke of said yoke away from said rearward pipe engaging sub-assembly.

4. The unitary tool assembly of claim 3 in which said linkage mechanism further includes:
(A) at least two elongated guides extending between said forward sub-assembly and said rearward sub-assembly, each elongated guide being fixed to said forward sub-assembly and slideably engaging said rearward subassembly; and
(B) a compression spring encompassing each said elongated guide and adapted to bias said forward sub-assembly and said rearward sub-assembly apart.

5. The unitary tool assembly of claim 4 which further includes first and second integral, outwardly directed stiffening flanges disposed, respectively, on the outer peripheries of said first and second partial collars.

6. The unitary tool assembly of claim 1 in which each of said first and second link members comprises a hydraulic ram.

7. The unitary tool assembly of claim 6 in which each of said slots is V-shaped, the legs of the V being configured convex outwardly with the length of each leg of the V and the distance between the unjoined ends of the V being the same and corresponding to the distance between said pivot journals of each pivot journal pair, whereby said reciprocative actuator pivots about said upper pivot journal of each pivot journal pair during a stroke of said reciprocative actuator toward said forward pipe engaging sub-assembly, and said reciprocative actuator pivots about said lower pivot journal of each pivot journal pair during a stroke of said reciprocative actuator away from said forward pipe engaging sub-assembly.

8. The unitary tool assembly of claim 7 in which said linkage mechanism further includes:
(A) at least two elongated guides extending between said forward sub-assembly and said rearward sub-assembly, each said elongated guide being fixed to said forward sub-assembly and slideably engaging said rearward subassembly; and
(B) a compression spring encompassing each said elongated guide and adapted to bias said forward sub-assembly and said rearward sub-assembly apart.

9. The unitary tool assembly of claim 8 which further includes first and second integral, outwardly directed stiffening flanges disposed, respectively, on the outer peripheries of said first and second partial collars.

* * * * *